United States Patent [19]

Peuke et al.

[11] Patent Number: 4,832,254
[45] Date of Patent: May 23, 1989

[54] PROCESS FOR THE MANUFACTURE OF AN INJECTION MOULD

[75] Inventors: Helmut Peuke, Hohentann; Gerd Riedel, Munich; Lothar Steinsdorfer, Rohr, all of Fed. Rep. of Germany

[73] Assignee: Agfa-Gevaert Aktiengesellschaft, Leverkusen-Bayerwerk, Fed. Rep. of Germany

[21] Appl. No.: 95,902

[22] Filed: Sep. 14, 1987

[30] Foreign Application Priority Data

Sep. 25, 1986 [DE] Fed. Rep. of Germany ....... 3632574
Dec. 24, 1986 [DE] Fed. Rep. of Germany ....... 3644523

[51] Int. Cl.$^4$ .......................... B29F 1/03; B29C 5/00; B23K 1/12
[52] U.S. Cl. .................................... 228/174; 228/161; 249/79
[58] Field of Search ....................... 249/78, 79, 80, 81; 425/549, 550, 570, 552, 572, 573, DIG. 9; 228/161, 165, 182, 174, 193; 72/478; 29/611

[56] References Cited

U.S. PATENT DOCUMENTS

| | | | |
|---|---|---|---|
| 4,017,242 | 4/1977 | Mercer | 425/549 |
| 4,269,586 | 5/1981 | Ronayne | 249/79 |
| 4,412,805 | 11/1983 | Morrison | 425/573 |
| 4,424,622 | 1/1984 | Krause | 29/611 |
| 4,439,915 | 4/1984 | Gellert | 29/611 |
| 4,486,934 | 12/1984 | Reed | 228/161 |
| 4,648,546 | 3/1987 | Gellert | 228/165 |

*Primary Examiner*—M. Jordan
*Attorney, Agent, or Firm*—Connolly and Hutz

[57] ABSTRACT

An injection mould having several gating points (3) which are all supplied with moulding material at the same time has a hot runner manifold (2) situated in a composite body. The composite body is composed of several plates (9,11,12,13,9') in which both the system of hot runners (2) and the tubular heating elements (10) required for heating are formed, starting from the surfaces of separation (F1, F2, F3, F4), whereupon the individual surfaces are joined together by diffusion welding after they have been pretreated as required (FIG. 2).

7 Claims, 3 Drawing Sheets

PROCESS FOR THE MANUFACTURE OF AN INJECTION MOULD

This invention relates to a process for the manufacture of an injection mould with improved hot runner manifold.

Injection moulds, for example for the serial processing of thermoplastic resins, contain a system of ducts for the molten thermoplast, comprising a hot runner manifold and the appropriate number of hot runner dies to which the mould inserts are attached. The hot runner die extrudes the liquid synthetic resin under a high pressure into the mould insert cavity situated between two plates and is distributed therein. In addition, the injection mould has a system of tempering channels in the form of bores through which a tempering medium flows to provide for rapid and uniform cooling of the moulded product. When the moulded mass has solidified, the injection mould opens and the moulded part is ejected or is removed by means of a gripper and the mould is then closed and the whole process is repeated.

Hot runner manifolds are required either when one moulding apparatus is used for simultaneously moulding several articles, for example the lids of film cartridges or the like, or when a large and complicated structure is to be moulded, which for geometrical reasons requires a plurality of gating points.

As may be seen from the monograph by Menges/-Mohren entitled "Anleitung für den Bau von Spritzgieswerkzeugen" (Instructions for the construction of injection moulds) (Hanser-Verlag, Munich, Vienna 1983), pages 167–170, hot runner manifolds used in injection moulds are intended to convey the molten moulding composition isothermally and with as little pressure loss as possible and without damage from the die to the cavity. All the diameters of the ducts carrying the molten mass should be calculated to keep the pressure loss and dwell time as low as possible and to ensure that all the gates are filled simultaneously. The problems arising under these conditions, for example, in a hot runner manifold in which the ducts for molten mass are formed by drilling and are possibly arranged in the form of cobwebs or networks in several planes, are discussed in the above mentioned monograph. Since the distributor ducts are introduced into the bores from outside and the bores must subsequently be sealed, residues of molten substance are liable to accumulate at the corners and edges and at the sealing plugs and give rise to faults in the extruded moulding and therefore to rejects.

Another problem to be solved is that the heating cartridges or tubular heating elements used for heating must be embedded in such a manner that they transmit heat uniformly to the hot runner manifolds but carry as little heat as possible to the outside.

DE-OS 3 523 281 describes an injection mould distributor composed of two plates in which heating elements are inserted in its external surfaces and a thermally conductive copper alloy is poured into the heating channels and at the same time into the connecting surfaces between the plates in a single heating step to bring about hard soldering. A manifold manufactured by this procedure would presumably become "soft" after prolonged use due to the continuous fluctuations in temperature and would therefore lose its stability.

The problem therefore arose of finding a process for the manufacture of a hot runner manifold for injection moulds, in which all sections of the runners would have optimum diameters with regard to pressure loss, dwell time and filling time so that the filling times of the gating points would be correctly adjusted to one another, deflections through sharp angles and the formation of dead corners would be avoided, leakages which are liable to occur at the closure plugs or deflection joints of conventional hot runner manifolds would be eliminated, the heating system would be incorporated in the structure in such a manner that the interior of the hot runner manifold would be uniformly heated but at the same time little energy would be transmitted to the outside, and introduction of the thermally highly conductive material and subsequent work on the composite body would be carried out in such a manner that no leakage problems would arise.

This invention has solved this problem by a process having the features indicated in the characterising parts of the claims.

Further details of the invention may be found in the description and drawings.

BRIEF DESCRIPTION OF THE DRAWINGS

The invention is described below with reference to the drawings, in which.

DETAILED DESCRIPTION OF THE DRAWINGS

Figure 1:
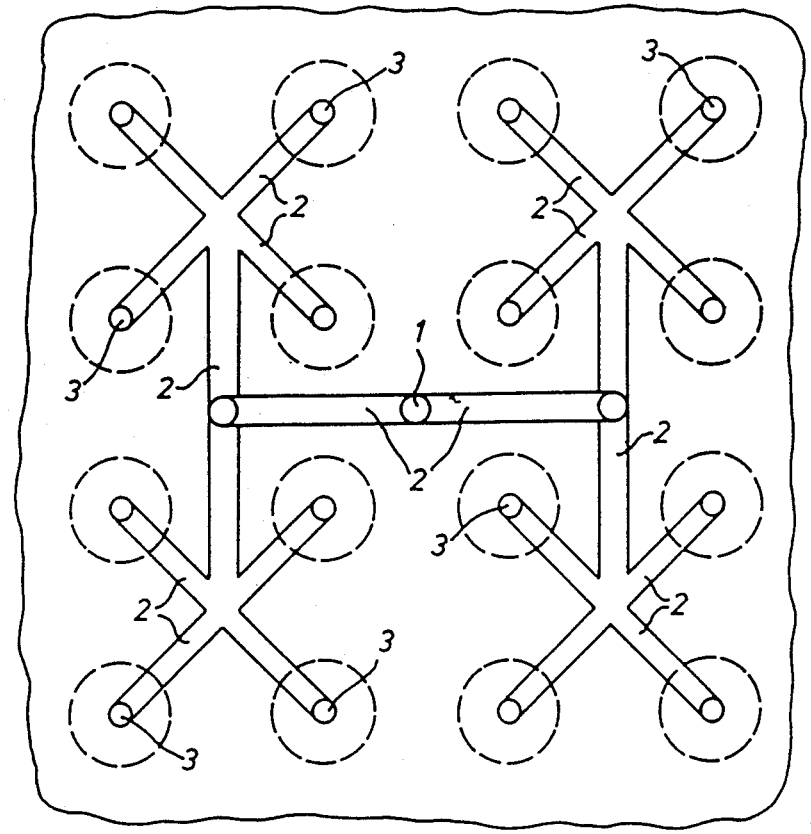
FIG. 1 is a top plan view of a conventional hot runner manifold.

The liquid synthetic resin supplied from a melting device (not shown) is introduced under pressure through the die (1) of the injection moulding machine to be distributed from there through a distributor system (2) into hot runner dies (3) to be conveyed to the cavities (not shown). If a mass produced article is to be obtained by injection moulding, the hot runner manifold may have the structure illustrated in FIG. 1, in which sixteen articles may be produced simultaneously.

Figure 2:
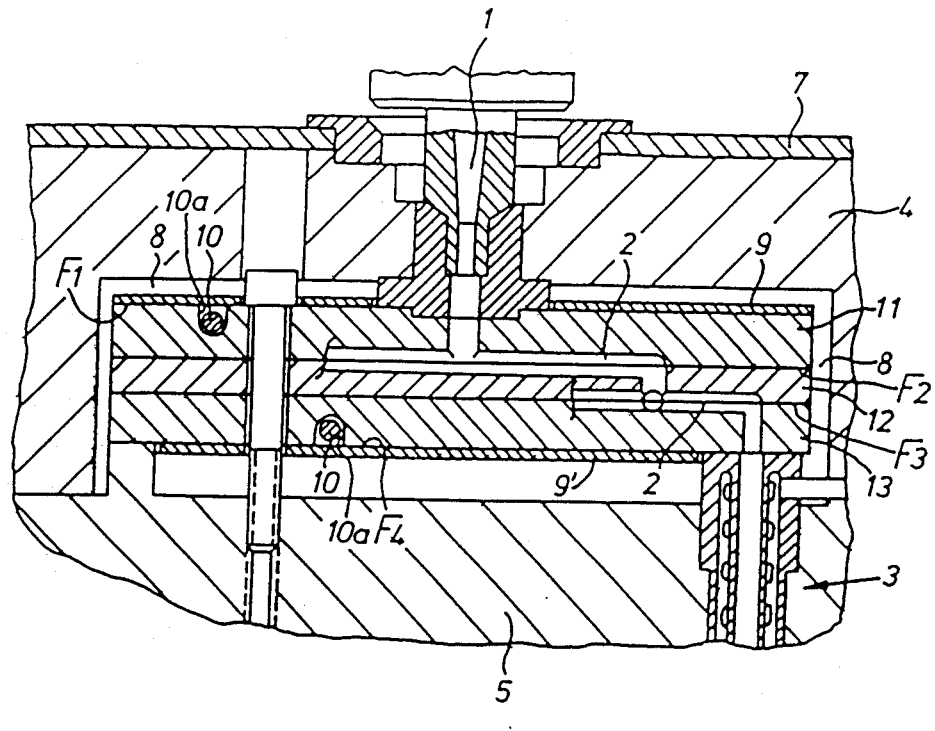
FIG. 2 is a cross-section through a hot runner manifold produced by the process according to the invention.

FIG. 2 represents a cross-section through an injection mould with hot runner manifold. Such a mould normally consists of a steel block (4,5) which is held together by screws and is covered on the outside by a heat insulating layer (7) and may be separated from the hot runner manifold by an air gap (8). The manifold containing the hot channels (2) is normally made in a single piece and consists of tool steel. The channels are formed in the manifold by bores which are introduced from outside and then sealed by plugs as already mentioned. The manifold may be insulated against the outside by aluminium plates (9,9') attached by screws. A heating system (10) consisting, for example, of tubular heating elements or heating cartridges is integrated with the manifold.

The inventive idea consists in that the hot runner manifold is produced as a composite body, preferably of tool steel, composed of a plurality of plates, at least two in number. The plates (11,12,13) are of such dimensions that the heating channels can be formed by cutting and drilling in the surfaces of separation (F2, F3) which are subsequently to be joined together.

The hot runner manifold is normally situated in a single plane, for example the plane in which the surface (F2) is situated, although it may be necessary to arrange the manifold in several planes (F2, F3) if complicated parts are to be moulded or if the conditions for distribution demand it for other reasons. In FIG. 2, for example, two such planes are shown. In that case, it is necessary to cut and machine three plates. Whatever the number of plates required, only a proportion of the cross-section of the channel, for example half the cross-section, is machined out of each plate as described. It will be obvious that it is then much easier to provide the required number, distribution and cross-sectional form of the heating channels without any of the bores extending to the outside.

Channels (10a) for the insertion of heating elements (10) are worked into the external surfaces (F1, F4) of the plates (11,13). These channels are placed in the thermodynamically most suitable arrangement in relation to the hot runners. They may, as described below, be filled with a metal of good thermal conductivity such as copper or a suitable alloy for the purpose of improved heat transmission. Cover plates (9,9') may subsequently be placed on the external surfaces.

After suitable pretreatment of the surfaces of separation (F1, F2, F3, F4), which is described below, the plates (9,11,12,13,9') are joined together by diffusion welding.

Diffusion welding, which is used for various purposes, is a process in which the surfaces in contact with each other diffuse one into the other, as described in "Welding Handbook", 7th Edition, Volume III, pages 312 et seq. This means that the grain boundaries grow beyond the surfaces of separation. The seam heals by a process of recrystallisation so that the mechanical strength of the material such as tool steel is preserved 100%. It is known from Patent Specifications DE-AS No. 1 652 878, DE-OS Nos. 2 372 774, 3 340 235 and 3 401 670, AT No. 245 895 and EP Nos. 0 091 371 and 0 167 492 that diffusion welding may be used for joining together either identical or different materials, e.g. steel to copper, ceramics to niobium, etc. The pretreatment required to be carried out on the surfaces to be joined together is also described in the said documents.

The surfaces of separation (F1, F2, F3, F4) along which the parts are to be joined together are preferably ground down until the surface roughness is reduced to $Rz < 3\mu$, and the plates are then subjected to repeated cleaning processes, preferably with ultrasound and the use of cleaning agents such as caltron, acetone and/or ethanol. The parts are then fitted together and introduced into a chamber which may be evacuated to a residual pressure of $<40$ Torr, preferably $<0.01$ Torr, although a protective gas atmosphere may be employed instead of evacuation, as described in DE-OS No. 2 372 774. At the same time, the parts of the mould which are to be welded together are uniformly heated to a temperature of 900° to 1100° C., in particular 1050° C., by inductive heating while being pressed together hydraulically under a pressure of 10 to 30 N/mm², preferably 15 N/mm², for 0.5 to 4 hours, preferably 2 hours. The mould is then slowly cooled and when the temperature has dropped to a certain level, preferably about 600° to 800° C., the pressure is removed before the mould is further cooled to room temperature. The channels (10a) in the composite body (9,11,12,13,9') thus obtained are then filled with thermally conductive material as described above.

In one variation of the process according to the invention, the parts of the composite body (11,12,13) are first joined together as described above and the heating elements (10) are then inserted in the channels (10a) and filled, and the plates (9,9') are then joined to the composite body by diffusion welding after pretreatment of the surfaces (F1, F4). In that case, the plates may be made of a material different from that of the other parts of the composite body, for example they may be made of aluminium but the parameters for the process of diffusion welding, such as the temperature, pressure and time of application of pressure must then be adjusted accordingly.

The assembled hot runner manifold with all its parts fused together may subsequently be processed in whatever manner required and installed in the steel block (4,5).

If, in the process described above, the external plates (9,9') have been attached by means of screws, leakages are liable to occur during subsequent processes carried out on the composite body, especially during the hardening process, and the metal which has been poured in is liable to escape between the surfaces of contact.

There has therefore been developed a variation of the injection moulding distributor according to the invention, in which the heating channels are placed in the interior of the distributor to ensure uniform distribution of temperature therein. In addition, the operation of filling the heating channels is combined with the subsequent hardening of the distributor to impart to it the required stability by a suitable treatment in a vacuum furnace.

Figure 3:
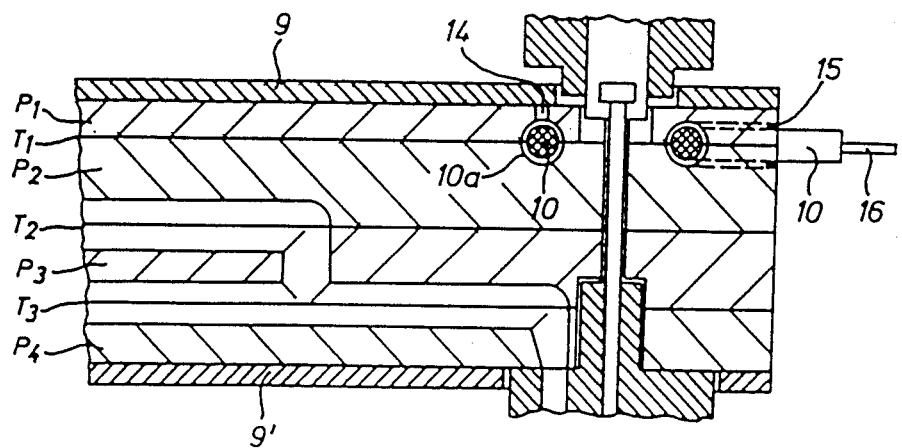
FIG. 3 is an enlarged partial cross-section through another embodiment of a hot runner manifold produced by the process according to the invention.
Figure 4:
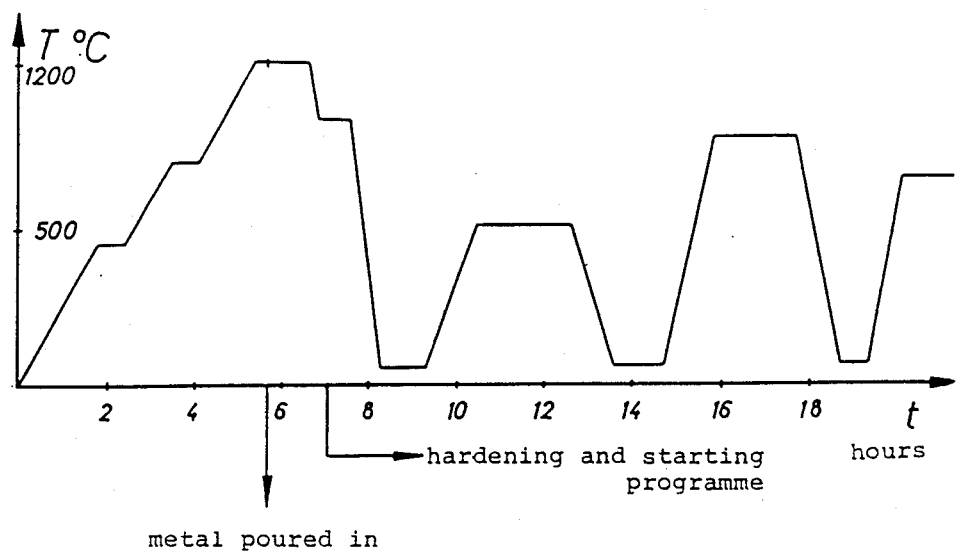
FIG. 4 is a temperature/time graph for producing the composite body illustrated in FIG. 3.

The hot runner manifold constructed according to this variation of the process according to the invention as illustrated in FIG. 3 is composed of several plates P1, P2, P3, P4 of hot working tooled steel with surfaces of separation T1, T2, T3. A system of channels (10a) for accommodating the tubular heating elements (10) is worked into at least one surface of separation and a bore (14) is subsequently drilled into this element from outside. When the parts of the composite body containing the tubular heating elements have been joined together by diffusion welding, the channels are sealed up at the points of exit (15) of the heating elements from the composite body, which are also the points at which the electric leads (16) may be connected to the current supply. This sealing up of the channels may be carried out by welding or, if low melting alloys are used, the channels may be sealed up by means of a thermally conductive cement such as Thermon (manufactured by Prema-Technik/Frankfurt). A metal or metal alloy of high thermal conductivity such as copper, beryllium-copper or a Zn-Al-Mg-Cu alloy is then placed in a funnel (not shown) which is connected to the bore (14). The whole apparatus is then introduced into a vacuum hardening furnace which is operated at a vacuum of $10^{-2}$ to $10^{-3}$ mbar, and the apparatus is heated in the furnace either continuously or stepwise to the melting temperature of the metal or alloy; in the case of copper, to about 1100° C. The liquid metal then flows into the system of channels so that the tubular heating elements are filled with metal or alloy. The known, prior art process of hardening the composite body is then carried out in the furnace by cooling the composite body to about 65° C. with a blast of nitrogen and then repeatedly heating it to temperatures of 500° to 600° C. and again cooling it with a blast of nitrogen. A temperature curve of this process is shown by way of example in FIG. 4.

The finishing work on the composite body is finally carried out and the body is covered with heat insulating or heat reflecting plates (9,9′) from outside, for example by attaching them with screws, and the body is installed in the injection mould.

It will be clear from the above description that the process according to the invention for the production of a hot runner manifold for injection moulds has the following advantages:

Both the system of hot runners and the heating means can easily be worked into the structure of the manifold and channels of the necessary cross-section for optimum distribution can be formed in the manifold, special advantages being obtained in systems of channels situated in several planes, as shown in FIGS. 2 and 3;

The hot runner manifold produced by the process according to the invention, with its system of tubular heating elements cast into its interior, has a homogeneous temperature distribution;

After its parts have been joined together by diffusion welding, the composite body may be machined or otherwise processed as desired;

If a composite body is first produced from plates (11,12,13), then the metal can be poured into the channels, starting from the external surfaces (F1, F4), after the parts have been joined by diffusion welding, and the external plates (9,9′) may subsequently be attached to the composite body by a further process of diffusion welding or they may be attached by screws;

If the plates (9,11,12,13,9′) are joined together in a single working step to form the composite body, the liquid metal is subsequently poured into the cavities (10a) from the points of exit of the tubular heating elements, and these inlets are then sealed off;

The flow of material in the hot runner manifold and the time required for filling the cavities are better adjusted to one another.

These advantages, the full benefit of which is obtained in the mass production of articles such as film cartridge lids, more than offset the disadvantage of the necessity of pre-treating the material for the process of diffusion welding and the costs of a diffusion welding apparatus.

We claim:

1. Process for the manufacture of a hot runner manifold for injection moulds, in which the system of channels lies in one or more planes and heating is effected by a system of pipes which is substantially heat insulated against the outside, characterised in that when the hot runner manifold lies in n planes one above the other (n=1, 2, 3, ...), a composite body is produced from at least n+1 plates (11,12,13) and the channels (2) through which the molten material is to flow are formed in the internal surfaces (F2, F3) at which the plates are to be joined together while channels (10a) for the insertion of tubular heating elements (10) are worked into the external surfaces (F1, F4) of said plates, which channels may be covered to separate them from the outside by further plates (9,9′), whereupon the surfaces which are to be joined together (F1, F2, F3, F4) are freed from impurities and the plates are then joined together by diffusion welding.

2. Process according to claim 1, characterised in that a thermally highly conductive metal or metal alloy is poured into the cavities (10a) between the tubular heating elements (10) and the external plates (9,9′).

3. Process for the manufacture of a hot runner manifold for injection moulds according to claim 1, characterised by the following process steps:
   (a) The formation of channels (10a) in at least one of the surfaces of separation (T1, T2, T3) of the composite body which is composed of plates (P1, P2, P3, P4) and the formation of a bore (14) in at least one of the plates to reach the system of channels (10a);
   (b) The insertion of tubular heating elements (10) into the system of channels (10a);
   (c) The joining together of the plates by diffusion welding;
   (d) The sealing off of the outlets (15) of the tubular heating elements by welding and the pouring of a material of high thermal conductivity through the bore (14) into the system of channels (10a) in the composite body which is heated to the melting temperature of the material to be poured in and which is put under a vacuum of $10^{-2}$ to $10^{-3}$ mbar, and
   (e) subjection of the composite body to a blast of nitrogen followed by repeated heating and cooling to harden the composite body.

4. Hot runner manifold for injection moulds for the production of moulded parts from thermoplastic synthetic resins, prepared in accordance with the process of claims 1, 2 or 3.

5. Hot runner manifold for injection moulds according to claim 4, characterised in that plates (11,12,13) which contain the system of channels and the further plates (9,9′) are made of tooled steel or hot working tool steel.

6. Hot runner manifold for injection moulds according to claim 4, characterised in that the plates (11,12,13) are made of tool steel and the external plates (9,9′) are made of aluminium.

7. Hot runner manifold for injection moulds according to claim 4, wherein a distribution of cross-sections in the system of channels is so constructed and arranged that all the cavities become filled with the same period of time.

* * * * *